United States Patent
Miyashita (10) Patent No.: US 10,730,451 B2
(45) Date of Patent: Aug. 4, 2020

(54) STACKED COMPOSITE INTERIOR COMPONENT

(71) Applicant: TOYODA IRON WORKS CO., LTD., Toyota-shi, Aichi-ken (JP)

(72) Inventor: Osamu Miyashita, Toyota (JP)

(73) Assignee: TOYODA IRON WORKS CO., LTD., Toyota-Shi, Aichi-Ken (JP)

( * ) Notice: Subject to any disclaimer, the term of this patent is extended or adjusted under 35 U.S.C. 154(b) by 279 days.

(21) Appl. No.: 15/746,861

(22) PCT Filed: Jul. 27, 2016

(86) PCT No.: PCT/JP2016/072057
§ 371 (c)(1),
(2) Date: Jan. 23, 2018

(87) PCT Pub. No.: WO2017/018458
PCT Pub. Date: Feb. 2, 2017

(65) Prior Publication Data
US 2020/0079296 A1    Mar. 12, 2020

(30) Foreign Application Priority Data
Jul. 28, 2015    (JP) .................................. 2015-148890

(51) Int. Cl.
*B60R 13/02*    (2006.01)
*B32B 3/30*    (2006.01)

(52) U.S. Cl.
CPC ............... *B60R 13/02* (2013.01); *B32B 3/30* (2013.01); *B32B 2307/51* (2013.01); *B32B 2605/003* (2013.01)

(58) Field of Classification Search
CPC ...................................................... B60R 13/02
USPC ........................................................ 428/172
See application file for complete search history.

(56) References Cited

U.S. PATENT DOCUMENTS

| | | | |
|---|---|---|---|
| 5,927,786 A | 7/1999 | Kawai et al. | |
| 2010/0264680 A1* | 10/2010 | Ishikawa | B60R 21/0428 296/1.09 |
| 2015/0072105 A1 | 3/2015 | Miyashita et al. | |

(Continued)

FOREIGN PATENT DOCUMENTS

| | | |
|---|---|---|
| JP | 9-220983 | 8/1997 |
| JP | 2010-253967 | 11/2010 |
| JP | 2014-113857 | 6/2014 |

(Continued)

OTHER PUBLICATIONS

International Preliminary Report on Patentability in international application No. PCT/JP2016/072057 dated Jan. 30, 2018.

*Primary Examiner* — Brent T O'Hern
(74) *Attorney, Agent, or Firm* — Finnegan, Henderson, Farabow, Garrett & Dunner, LLP (57) ABSTRACT

An interior component includes a base member and an outer member, which is stacked on the base member. The outer member is provided with projections and protruding portions. The projections project from an opposing surface, which is opposed to the base member. The projections are deformed while bending in a falling manner in specific directions by contacting the base member. The protruding portions protrude from the opposing surface and are provided on the paths along which the projections are deformed.

3 Claims, 6 Drawing Sheets

(56) References Cited

U.S. PATENT DOCUMENTS

2015/0306842 A1 10/2015 Miyashita
2016/0207277 A1 7/2016 Miyashita et al.

FOREIGN PATENT DOCUMENTS

WO  WO 2013/132677 A1  9/2013
WO  WO 2015/037144 A1  3/2015

* cited by examiner

STACKED COMPOSITE INTERIOR COMPONENT

CROSS-REFERENCE TO RELATED APPLICATIONS

This application is a national phase application of International Application No. PCT/JP2016/072057, filed Jul. 27, 2016, and claims the priority of Japanese Application No. 2015-148890, filed Jul. 28, 2015, the content of both of which is incorporated herein by reference.

TECHNICAL FIELD

The present invention relates to a stacked composite interior component that obtains a cushioning property by bending a great number of projections.

BACKGROUND ART

Conventionally, an interior component including a first member and a second member that includes projections is known. The interior component is configured such that the projections project toward the first member and bend. When the second member is pressed in toward the first member, some or all of the projections contact the first member and bend. This brings about soft tactile sensation from the interior component.

Patent Document 1 discloses an interior component that includes a base member and a cover that has projections. The direction in which each of the projections bends intersects the direction in which an adjacent one of the projections bends. In the interior component of Patent Document 1, any adjacent ones of the projections contact each other when the cover is pressed in toward the base member.

In the interior component of Patent Document 1, in order to restrict bending deformation of any adjacent ones of the projections, the adjacent projections must bend in the same manner. However, the adjacent projections do not necessarily bend in a desired manner. For example, one of the adjacent projections may not bend while the other one does. In this case, the bending one of the projections, from its proximal end to distal end, closely contacts the surface of the cover that faces the base member. In this state, if the cover is released from pressing, the projections are elastically restored. However, this instantaneously cancels the close contact between the projections and the cover, thus generating noise. The noise is caused by rapid change of the pressure that occurs between the cover and the projections.

PRIOR ART DOCUMENT

Patent Document

Patent Document 1: Japanese Laid-Open Patent Publication No. 2010-253967

SUMMARY OF THE INVENTION

Problems that the Invention is to Solve

Accordingly, it is an objective of the present invention to provide a stacked composite interior component that reduces noise generation.

Means for Solving the Problems

To achieve the foregoing objective and in accordance with a first aspect of the present invention, a stacked composite interior component including a first member and a second member stacked on the first member is provided. The second member includes a projection and a close contact restricting portion. The projection projects from an opposing surface opposed to the first member and is deformed while bending in a falling manner by contacting the first member. The close contact restricting portion restricts close contact between the projection and the opposing surface. The close contact restricting portion is arranged at a position on the opposing surface that is spaced from a proximal end of the projection by a distance shorter than or equal to a projecting length of the projection.

MODES FOR CARRYING OUT THE INVENTION

A stacked composite interior component according to one embodiment of the present invention will now be described with reference to FIGS. 1 to 8.

Figure 1:
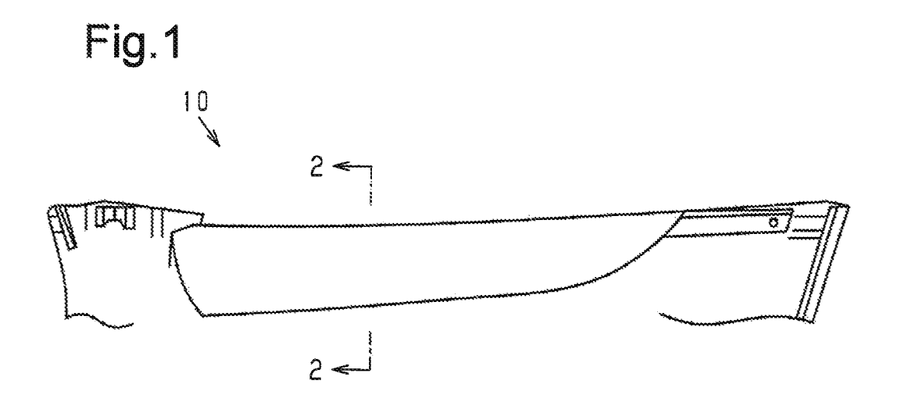
FIG. 1 is a schematic diagram showing a door trim for a vehicle that uses a stacked composite interior component according to the present invention.

As shown in FIG. 1, a stacked composite interior component 10 (hereinafter, the interior component 10) configures part of a door trim for a vehicle.

Figure 2:
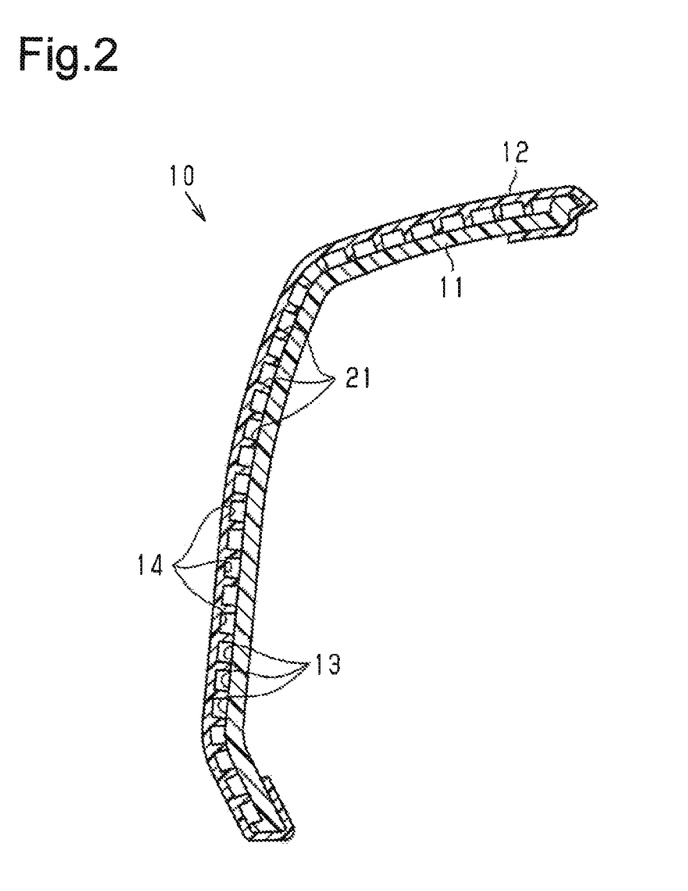
FIG. 2 is a cross-sectional view taken along line 2-2 of FIG. 1.

With reference to FIG. 2, the interior component 10 includes a plate-shaped base member 11 and an outer member 12, which is stacked on the base member 11. The outer member 12 is exposed to the interior of the passenger compartment of the vehicle. The base member 11, which serves as a first member, has a first opposing surface 13, which is a surface opposed to the outer member 12. The outer member 12, which serves as a second member, has a second opposing surface 14, which is a surface opposed to the base member 11. The outer member 12 is stacked on the base member 11 such that the second opposing surface 14 is arranged parallel to the first opposing surface 13.

The base member 11 is made of a plastic such as polypropylene. The base member 11 configures the basic framework of the stacked composite interior component. The outer member 12 is made of comparatively soft, elastically deformable plastic such as soft polyvinyl chloride.

Figure 3:
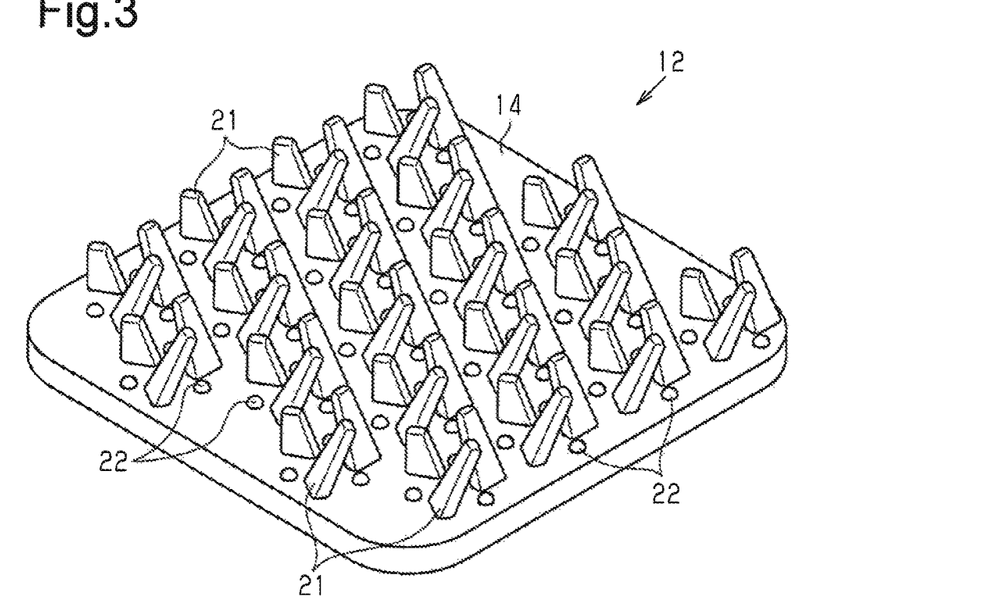
FIG. 3 is a perspective view showing an outer member.
Figure 4:
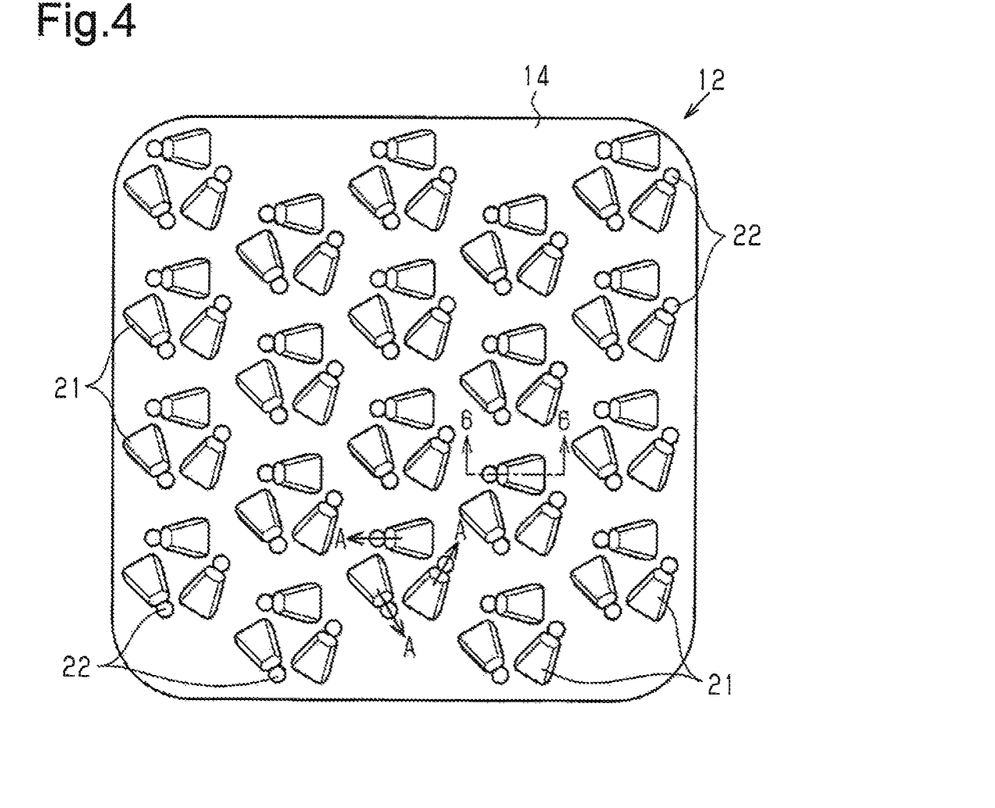
FIG. 4 is a plan view showing the outer member.

As illustrated in FIGS. 3 and 4, a great number of projections 21 and the same number of protruding portions 22 project from the second opposing surface 14 of the outer member 12.

Figure 5:
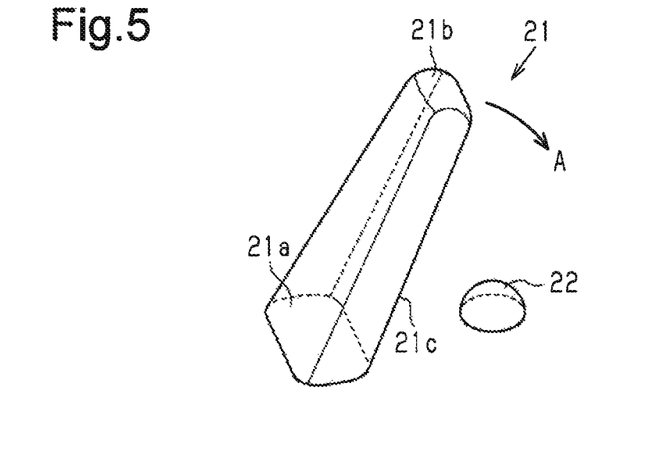
FIG. 5 is a perspective view showing a projection and a protruding portion.
Figure 6A:
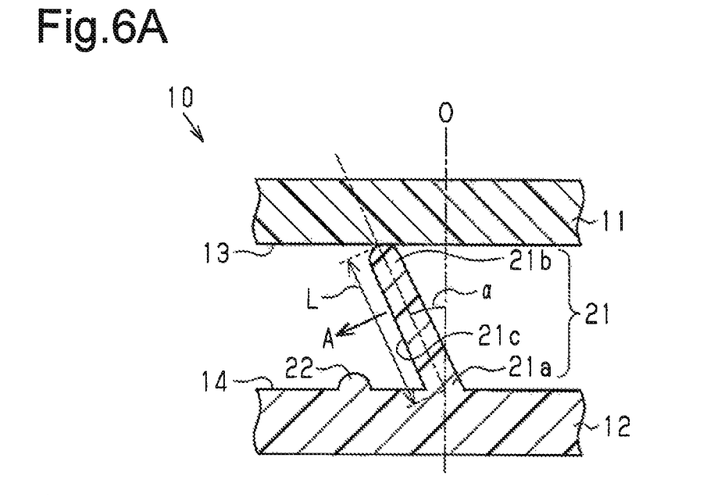
FIG. 6A is a cross-sectional view taken along line 6-6 of FIG. 4.

Referring to FIGS. 5 and 6A, the bottom surface of a proximal end 21a of each of the projections 21 has a rectangular shape. Each projection 21 is an inclined rectangular pyramid in which every corner is rounded. The projection 21 is inclined by the inclination angle α with respect to the normal line O, which is perpendicular to the second opposing surface 14. As a result, when a force is applied from the base member 11 to the outer member 12 along the normal line O, the projection 21 bends in the bending direction A as shown in FIG. 6A. The projection 21 is thus elastically deformed to increase the inclination angle α. That is, the direction in which projection 21 is deformed is anisotropic.

The projecting length L of the projection 21 is the length from the proximal end 21a to a distal end 21b. The surface of the projection 21 that faces in the bending direction A is an engagement surface 21c. Before the outer member 12 is pressed, the distal end 21b of the projection 21 is always held in contact with the first opposing surface 13.

The protruding portions 22 project from the second opposing surface 14 and each have a semispherical outer surface. Each of the protruding portions 22 is arranged at the position on the second opposing surface 14 spaced from the proximal end 21a of the corresponding one of the projections 21 by a distance shorter than or equal to the projecting length L in the bending direction A. Each protruding portion 22 is arranged on the path along which the corresponding projection 21 is deformed while bending. The protruding portion 22, which serves as a close contact restricting portion, configures a section of the outer member 12 and is elastically deformable.

The operation of the interior component 10 will hereafter be described.

Figure 6B:
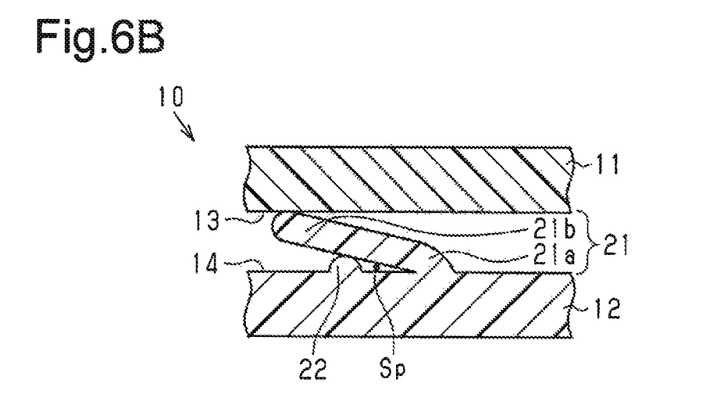
FIG. 6B is a cross-sectional view showing a section of a base member and a section of the outer member when the base member and the outer member are close to each other.

As illustrated in FIGS. 6A and 6B, when the outer member 12 is pressed in toward the base member 11, the first opposing surface 13 and the second opposing surface 14 are brought close to each other. This applies force to the distal end 21b of each projection 21 along the normal line O from the base member 11 to the outer member 12. The projection 21 thus bends in the bending direction A and is elastically deformed to increase the inclination angle α.

As has been described, each protruding portion 22 is arranged at the position spaced from the proximal end 21a of the corresponding projection 21 by the distance shorter than or equal to the projecting length L in the bending direction A. Therefore, as the projection 21 is deformed to increase the inclination angle α, the inclination angle α reaches such an angle that the engagement surface 21c of the projection 21 comes into contact with the protruding portion 22. This forms space Sp between the engagement surface 21c and the second opposing surface 14, as illustrated in FIG. 6B. The engagement surface 21c thus does not come into close contact with the second opposing surface 14.

Figure 7:
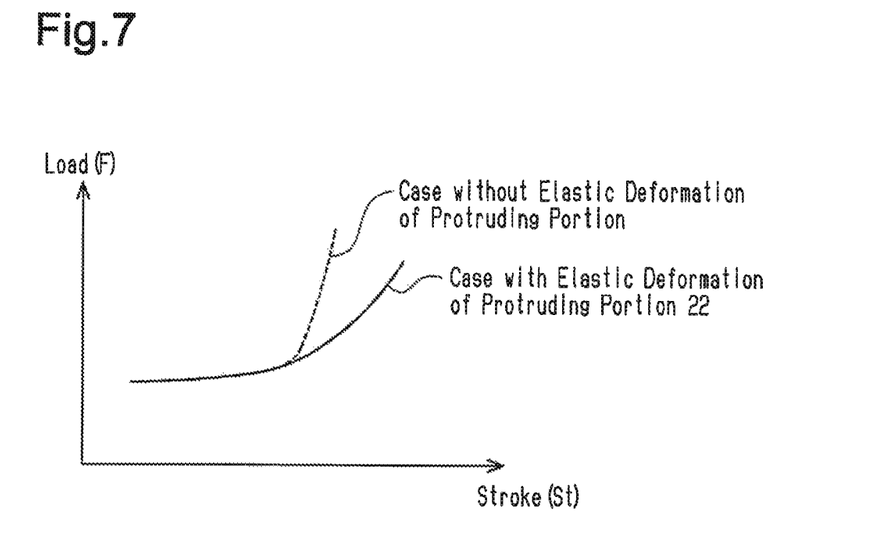
FIG. 7 is a graph representing the relationship between the bending deformation amount (the stroke) and the load of each projection as compared between a case where an elastically deformable material is used for each protruding portion and a case where such a material is not used for the protruding portion.

Also, the protruding portion 22 is elastically deformable. As a result, as the outer member 12 is pressed in further toward the base member 11 after the engagement surface 21c comes into contact with the protruding portion 22, the protruding portion 22 is gradually flattened to allow the projection 21 to bend further. This reduces rapid change of the load F acting on the outer member 12 in relation to the pressed-in amount (the stroke St) of the outer member 12 toward the base member 11, as represented in FIG. 7, as compared to a case where the protruding portion is not deformed elastically.

Figure 8:
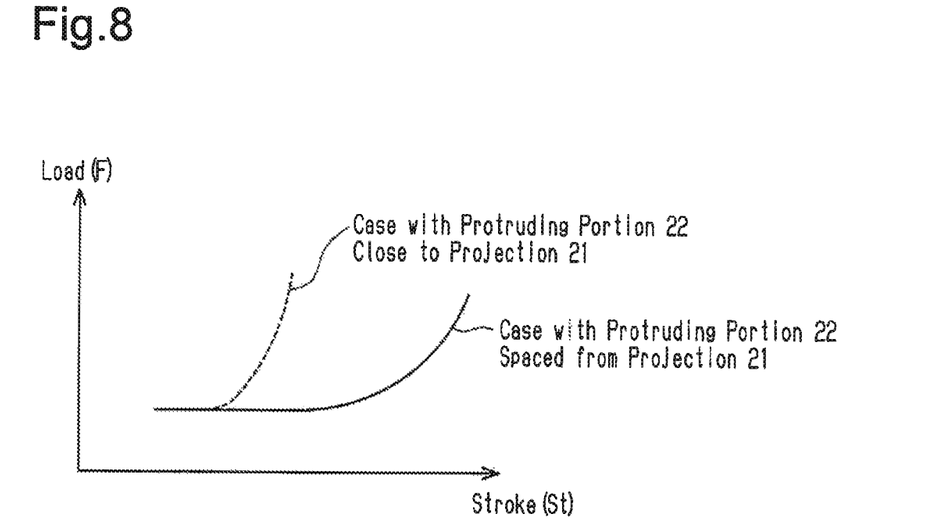
FIG. 8 is a graph representing the relationship between the bending deformation amount (the stroke) and the load of each projection as compared between a case where the distance between the projection and the corresponding protruding portion is short and a case where such distance is long.

With reference to FIG. 8, the longer the distance between each projection 21 and the corresponding protruding portion 22, the smaller becomes the change of the load F in relation to the stroke St. On the other hand, the shorter the distance between the projection 21 and the protruding portion 22, the greater becomes the change of the load F in relation to the stroke St. These facts are caused by the facts that the longer the distance between each projection 21 and the corresponding protruding portion 22, the greater becomes the deformation amount of the projection 21 until the projection 21 comes into contact with the protruding portion 22 and that, on the other hand, the shorter the distance between the projection 21 and the protruding portion 22, the smaller becomes the deformation amount of the projection 21 until the projection 21 comes into contact with the protruding portion 22.

The present embodiment achieves the following advantages.

(1) The protruding portions 22 project from the second opposing surface 14. Each protruding portion 22 is arranged on the path along which the corresponding projection 21 contacts the first opposing surface 13 of the base member 11 and is deformed while bending in the bending direction A. In this configuration, as the projection 21 is deformed to cause contact between the engagement surface 21c and the protruding portion 22, the space Sp is formed between the engagement surface 21c and the second opposing surface 14. The engagement surface 21c thus does not come into close contact with the second opposing surface 14. As a result, when the projection 21 is elastically restored, rapid change of pressure is unlikely to occur between the engagement surface 21c and the second opposing surface 14. This reduces noise generation caused by pressure change between the engagement surface 21c and the second opposing surface 14.

(2) Each protruding portion 22 is elastically deformable. As a result, when the outer member 12 is pressed in further toward the base member 11 after the engagement surface 21c comes into contact with the protruding portion 22, the protruding portion 22 is gradually flattened to allow the projection 21 to bend further. This reduces rapid change of the load F acting on the outer member 12 with respect to the stroke St of the outer member 12 toward the base member 11. The tactile sensation of the outer member 12 at the time the outer member 12 is pressed is thus further softened.

(3) The protruding portions 22 are arranged by the number equal to the number of the projections 21 such that each of the projections 21 and the corresponding one of the protruding portions 22 form a pair. This allows the change of the load F acting on the outer member 12 to be adjusted as needed with respect to the stroke St of the outer member 12 toward the base member 11 by changing the distance between each projection 21 and the corresponding protruding portion 22. Also, different tactile sensations are obtained depending on the position at which the outer member 12 is pressed in toward the base member 11.

The above illustrated embodiments may be modified as follows.

Figure 9:
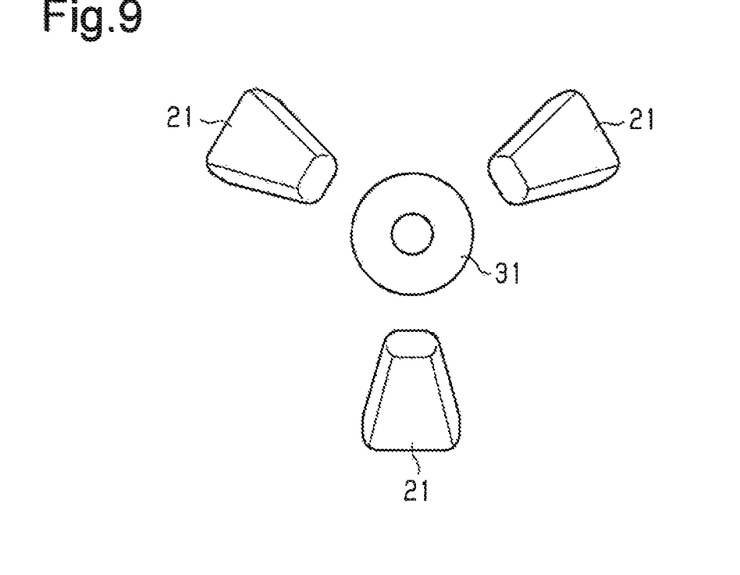
FIG. 9 is a plan view showing a composite interior component of a modification.

As illustrated in FIG. 9, the number of the projections and the number of the protruding portions may be changed such that three of the projections 21 share a single protruding portion 31. Also in this case, the same advantage as the advantage (1) of the above-described embodiment is obtained. In this case, the protruding portion 31, which is shown in FIG. 9, is a close contact restricting portion.

Figure 10:
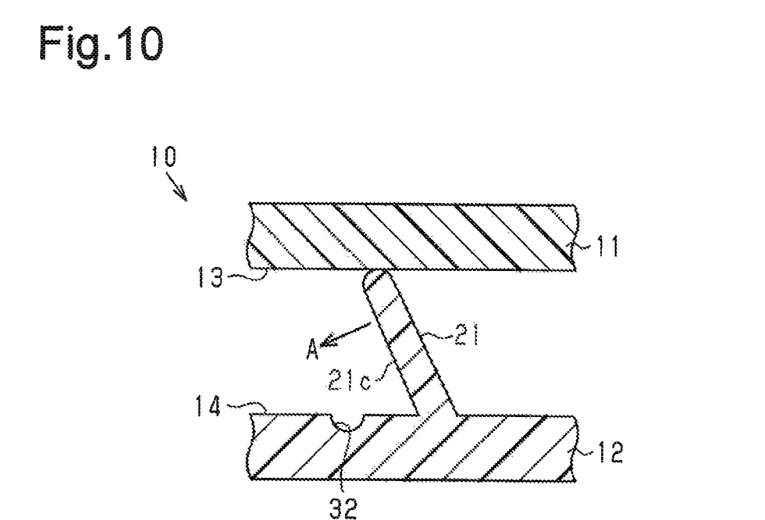
FIG. 10 is a cross-sectional view showing a section of a composite interior component of another modification.

In the above-described embodiment, a recess 32 may be used instead of each protruding portion 22 as shown in FIG. 10. Also in this case, the space Sp is formed between the engagement surface 21c and the second opposing surface 14 to restrict close contact between the engagement surface 21c and the second opposing surface 14. The same advantage as the advantage (1) of the above-described embodiment is thus obtained. In this case, the recess 32 corresponds to the close contact restricting portion.

Alternatively, both the protruding portions 22 and the recesses 32 may be arranged on the second opposing surface 14 of the outer member 12. In this case, each of the protruding portions 22 and each of the recesses 32 both correspond to the close contact restricting portion.

Figure 11:
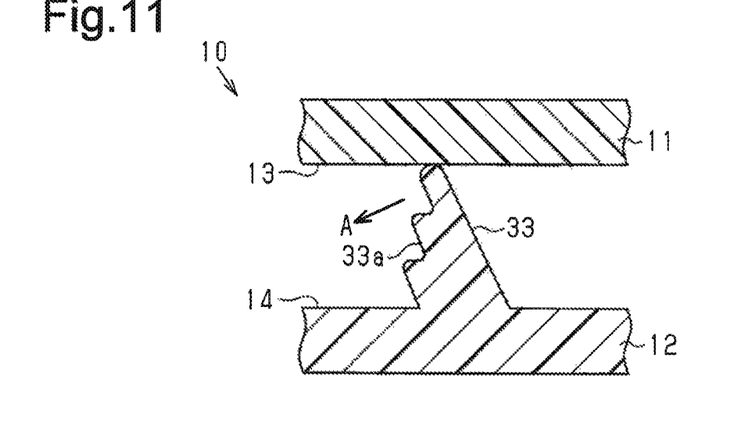
FIG. 11 is a cross-sectional view showing a section of a composite interior component of another modification.

In the above-described embodiment, as shown in FIG. 11, a projection 33 may be used instead of each projection 21 and the corresponding protruding portion 22. The projection 33 has a stepped portion 33b in a section facing in the bending direction A, which is a section corresponding to the engagement surface 21c of the above-described embodiment. The stepped portion 33a is formed in a stepped manner toward the distal end of the projection 33 by removing a section of the projection 33. Also in this case, the space Sp is formed between the stepped portion 33a and the second opposing surface 14 to restrict close contact between the stepped portion 33a and the second opposing surface 14. The same advantage as the advantage (1) of the above-described embodiment is thus obtained. In this case, the stepped portion 33a corresponds to the close contact restricting portion.

Figure 12:
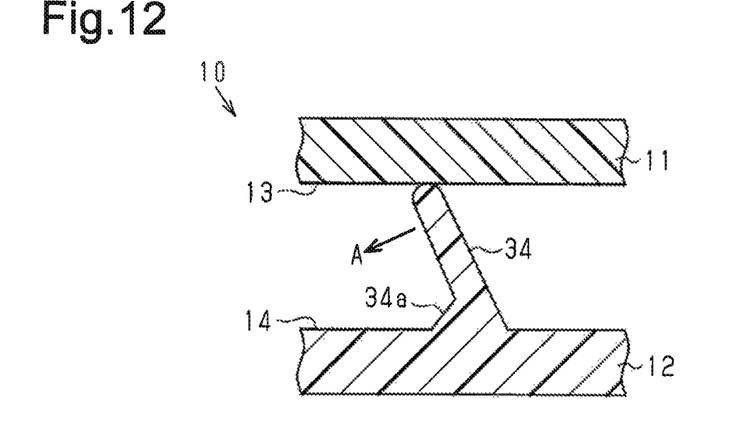
FIG. 12 is a cross-sectional view showing a section of a composite interior component of another modification.

Referring to FIG. 12, in the above-described embodiment, a projection 34 may be used instead of each projection 21 and the corresponding protruding portion 22. The projection 34 has a proximal end 34a, which bulges more in the bending direction A than the rest of the projection 34. In this configuration, the projection 34 is deformed while bending about an upper section of the proximal end 34a as the point of support. This forms the space Sp between the projection 34 and the second opposing surface 14, thus restricting close contact between the projection 34 and the second opposing surface 14. The same advantage as the advantage (1) of the above-described embodiment is thus obtained. In this case, the proximal end 34a corresponds to the close contact restricting portion.

Figure 13:
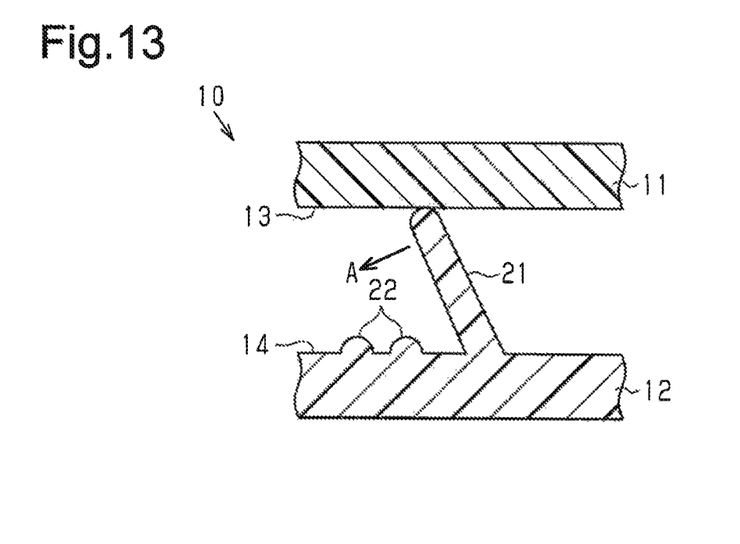
FIG. 13 is a cross-sectional view showing a section of a composite interior component of another modification.

In the above-described embodiment, as illustrated in FIG. 13, multiple (in the drawing, two) protruding portions 22 may be arranged in correspondence with each of the projections 21. Also in this case, the same advantage as the advantage (1) of the above-described embodiment is obtained.

In the above-described embodiment, the second opposing surface 14 may be an emboss-finished surface, not a smooth surface like a mirror surface. On the emboss-finished surface, slight dents and bumps are regularly arranged instead of the protruding portions 22. This configuration forms the space Sp between each projection 21 and the emboss-finished surface, thus restricting close contact between the projection 21 and the emboss-finished surface. The same advantage as the advantage (1) of the above-described embodiment is thus obtained. In this case, the emboss-finished surface corresponds to the close contact restricting portion.

In the above-described embodiment, the inclination angle α of each projection 21 may be adjusted as needed.

In the above-described embodiment, it is preferable to arrange the projections 21 in a lattice-like manner with clearances of a predetermined size in between. This enhances the uniformness of the tactile sensation of the outer member 12.

In the above-described embodiment, the outer member 12 may be covered by covering material such as woven fabric, non-woven fabric, knitted fabric, vinyl chloride, or soft film, on the surface opposite to the base member 11. That is, the interior component 10 may have a laminated outer layer member that has a laminated structure with the outer member and the covering member.

In the above-described embodiment, the interior component 10 configures a section of a door trim for a vehicle. However, the interior component 10 may be employed in other sections. For example, the interior component 10 may be employed in a luggage side trim, an instrument panel, or an armrest. Alternatively, the interior component 10 may be employed in a panel component for any use other than the use in a vehicle.

In the above-described embodiment, the base member 11 may be made of a comparatively hard plastic such as hard polyvinyl chloride, polypropylene, polyethylene, or ABS. The outer member 12 may be made of various types of thermoplastic resin such as soft polyvinyl chloride or styrene-based, olefin-based, or polyester-based resin.

As long as the bending direction of each projection 21 is restricted, the projection 21 may be shaped in various manners. For example, the bending direction is restricted if the projection 21 is an inclined pyramid. The projection 21 is thus allowed to have a proximal end that may be shaped in various manners. Also, if the projection 21 is a pyramid in which the bottom surface of the proximal end has an oblong or rectangular shape having a difference between the measurement in a first direction and the measurement in a second direction perpendicular to the first direction, the bending direction of the projection is restricted due to the reason related to the second moment of area. The projection 21 thus may be replaced by a projection that satisfies the above-described condition.

In the above-described embodiment, each protruding portion 22 may be replaced by an annular protruding portion or annular recess that surrounds a projection 21. In this case, the bending direction of the projection 21 is non-restricted and may be any direction. For example, a conical body in which the bottom surface at the proximal end is shaped like a precise circle may be used instead of the projection 21. Also in this case, the same advantage as the advantage (1) of the above-described embodiment is obtained.

In the above-described embodiment, not all corners of each projection 21, which is an inclined rectangular pyramid, have to be rounded.

The invention claimed is:

1. A stacked composite interior component comprising a first member and a second member stacked on the first member, wherein
the second member includes a projection that projects from an opposing surface opposed to the first member and is deformed while bending in a falling manner by contacting the first member, and a semispherical protruding portion that is elastically deformed by contacting the projection and restricts a contact between the projection and the opposing surface, and the semispherical protruding portion is arranged at a position on the opposing surface that is spaced from a proximal end of the projection by a distance shorter than or equal to a projecting length of the projection.

2. The stacked composite interior component according to claim 1, wherein the projection and the semispherical protruding portion constitute a pair.

3. A stacked composite interior component comprising a first member and a second member stacked on the first member, wherein the second member includes a projection that projects from an opposing surface opposed to the first member and is deformed while bending in a falling manner by contacting the first member, and a recess that restricts a contact between the projection and the opposing surface, and the recess is arranged at a position on the opposing surface that is spaced from a proximal end of the projection by a distance shorter than or equal to a projecting length of the projection.

* * * * *